US011419276B2

(12) United States Patent
Kitahara et al.

(10) Patent No.: US 11,419,276 B2
(45) Date of Patent: Aug. 23, 2022

(54) GARDENING TRIMMER

(71) Applicant: MAKITA CORPORATION, Anjo (JP)

(72) Inventors: Mikihiro Kitahara, Anjo (JP);
Tomoyuki Kutsuna, Anjo (JP);
Nozomu Iwamoto, Anjo (JP);
Masayoshi Torihara, Anjo (JP)

(73) Assignee: MAKITA CORPORATION, Anjo (JP)

( * ) Notice: Subject to any disclaimer, the term of this patent is extended or adjusted under 35 U.S.C. 154(b) by 46 days.

(21) Appl. No.: 16/883,279

(22) Filed: May 26, 2020

(65) Prior Publication Data
US 2020/0375117 A1  Dec. 3, 2020

(30) Foreign Application Priority Data
May 27, 2019 (JP) .............................. JP2019-098345

(51) Int. Cl.
*A01G 3/053* (2006.01)
*A01G 3/04* (2006.01)

(52) U.S. Cl.
CPC ...... *A01G 3/053* (2013.01); *A01G 2003/0461* (2013.01)

(58) Field of Classification Search
CPC ........ A01G 3/04; A01G 3/0417; A01G 3/047; A01G 3/053; A01G 2003/0461; A01D 34/135; A01D 34/14; A01D 34/16
USPC .................... 30/208–210, 215–222
See application file for complete search history.

(56) References Cited

U.S. PATENT DOCUMENTS

| 2,787,111 | A | * | 4/1957 | Templeton | ........... | A01D 34/135 56/297 |
| 3,798,768 | A | * | 3/1974 | Cowley | ................... | A01G 3/053 30/223 |
| 4,280,276 | A | * | 7/1981 | Comer | ................... | A01G 3/053 30/144 |
| 4,619,045 | A | * | 10/1986 | Mayer | ................... | A01G 3/053 30/216 |
| 5,075,972 | A | * | 12/1991 | Huang | ................... | A01G 3/053 30/216 |

(Continued)

FOREIGN PATENT DOCUMENTS

| DE | 102020002970 A1 | * | 12/2020 | ............. | A01G 3/053 |
| EP | 0857411 B1 | * | 9/1999 | ............. | A01G 3/053 |

(Continued)

*Primary Examiner* — Jason Daniel Prone
(74) *Attorney, Agent, or Firm* — Sughrue Mion, PLLC

(57) ABSTRACT

A gardening trimmer may include a first blade configured to be driven by a prime mover in a reciprocating manner along a first direction and a guide disposed in a slot of the first blade to guide reciprocating motion of the first blade. The slot includes first and second inner side surfaces opposing each other and extending along the first direction. The guide includes an outer peripheral surface opposing the slot's inner side surfaces. The outer peripheral surface of the guide includes a first portion in contact with the first inner side surface and a second portion in contact with the second inner side surface. The outer peripheral surface of the guide is curved at least at the first and second portions, and curvature radii of the first and second portions are each greater than a half of a distance between the first and second inner side surfaces.

13 Claims, 5 Drawing Sheets

(56) References Cited

U.S. PATENT DOCUMENTS

| | | | |
|---|---|---|---|
| 5,138,908 A * | 8/1992 | Raetz | A01G 3/053 76/104.1 |
| 5,153,996 A * | 10/1992 | Kuzarov | A01G 3/053 30/216 |
| 5,987,753 A * | 11/1999 | Nagashima | A01G 3/053 30/216 |
| 6,415,515 B1 * | 7/2002 | Wheeler | A01G 3/053 30/208 |
| 6,467,990 B1 | 10/2002 | Kremsler et al. | |
| 6,594,879 B2 * | 7/2003 | Wheeler | A01G 3/053 100/295 |
| 6,910,276 B2 * | 6/2005 | Huang | A01G 3/053 30/216 |
| 7,406,770 B2 * | 8/2008 | Mace | A01D 34/14 30/216 |
| 7,788,811 B2 * | 9/2010 | Hanada | A01G 3/053 30/216 |
| 8,826,546 B2 * | 9/2014 | Svennung | A01G 3/053 30/216 |
| 8,959,780 B2 * | 2/2015 | Masalin | A01G 3/053 30/208 |
| 9,736,991 B2 * | 8/2017 | Hanada | A01G 3/053 |
| 10,321,636 B2 * | 6/2019 | Peterson | A01G 3/053 |
| 10,537,069 B2 * | 1/2020 | Wykman | A01G 3/053 |
| 2013/0326885 A1 * | 12/2013 | Kaupp | A01G 3/053 30/208 |
| 2018/0206410 A1 * | 7/2018 | Liu | A01G 3/053 |
| 2020/0045889 A1 * | 2/2020 | Shimizu | A01G 3/053 |
| 2021/0360863 A1 * | 11/2021 | Kitahara | A01G 3/053 |

FOREIGN PATENT DOCUMENTS

| | | | |
|---|---|---|---|
| JP | 58-024087 B2 | 5/1983 | |
| JP | 59-004231 U | 1/1984 | |
| JP | 03-019700 Y2 | 4/1991 | |
| JP | 2001-116021 A | 4/2001 | |
| JP | 2020191796 A * | 12/2020 | A01G 3/053 |

\* cited by examiner

GARDENING TRIMMER

CROSS-REFERENCE TO RELATED APPLICATION

This application claims priority to Japanese Patent Application No. 2019-98345, filed on May 27, 2019, the entire contents of which are incorporated herein by reference.

TECHNICAL FIELD

The present teachings relate to a gardening trimmer such as a hedge trimmer and a grass trimmer.

BACKGROUND

Japanese Patent Application Publication No. 2001-116021 describes a gardening trimmer. This gardening trimmer includes a prime mover and a pair of blades configured to be driven in a reciprocating manner by the prime mover. Each of the blades has slots extending being in a first direction defined therein, and into each of which slots a corresponding guide configured to guide the reciprocating motion of the blades is inserted.

SUMMARY

A round type and a polygonal type are known as shapes of such guides. For example, polygonal type guides are implemented for the gardening trimmer described in the document. If the guides are polygonal, the guides make contact with inner surfaces of the slots at their respective corners when the guides are inclined. The corners of the guides have a relatively small curvature radius, and thus there is a risk that if such corners contact the slot inner surfaces, a friction resistance exerted on the blade might increase. This may be a downside to the polygonal guides as compared to round guides.

In the meantime, when the polygonal guides are inclined relative to the slots, an interval between each guide and the blade is accordingly small. This eliminates excessive play between the guides and the blade, thereby suppressing uncomfortable vibration and/or noise. This point may be regarded as an advantage of the polygonal guides as compared to the round guides. As above, round and polygonal types have been employed as conventional guides, and they have respective advantages and downsides.

In light of the aforementioned matters, the present teachings disclose a novel gardening trimmer comprising an improved guide.

A gardening trimmer disclosed herein may comprise: a prime mover; a first blade configured to be driven by the prime mover in a reciprocating manner along a first direction, the first blade comprising a slot whose longitudinal direction extends along the first direction; and a guide disposed in the slot of the first blade so as to guide reciprocating motion of the first blade, wherein the slot of the first blade extends through the first blade in a second direction perpendicular to the first direction, and comprises a first inner side surface and a second inner side surface that oppose each other and extend along the first direction, the guide comprises an outer periphery opposing the first and second inner side surfaces of the slot, the outer periphery of the guide comprises a first portion being in contact with the first inner side surface of the slot and a second portion being in contact with the second inner side surface of the slot, the outer periphery of the guide is curved at least at the first portion and the second portion, and each of curvature radii of the first portion and the second portion is greater than a half of a distance between the first inner side surface and the second inner side surface of the slot.

In the aforementioned gardening trimmer, the outer periphery of the guide has a shape configured to contact the first inner side surface of the slot of the first blade at the first portion and contact the second inner side surface of the slot of the first blade at the second portion. Such a configuration allows the reciprocating motion of the first blade to be guided with greater stability, thereby suppressing uncomfortable vibration and/or noise. In addition, the outer periphery of the guide is curved at least at the first portion and the second portion, and each of curvature radii of the first portion and the second portion is greater than a half of a distance between the first inner side surface and the second inner side surface of the slot. Such a configuration may reduce contact pressure between the guide and the first blade, and accordingly reduce friction resistance exerted on the first blade.

DETAILED DESCRIPTION

Figure 1:
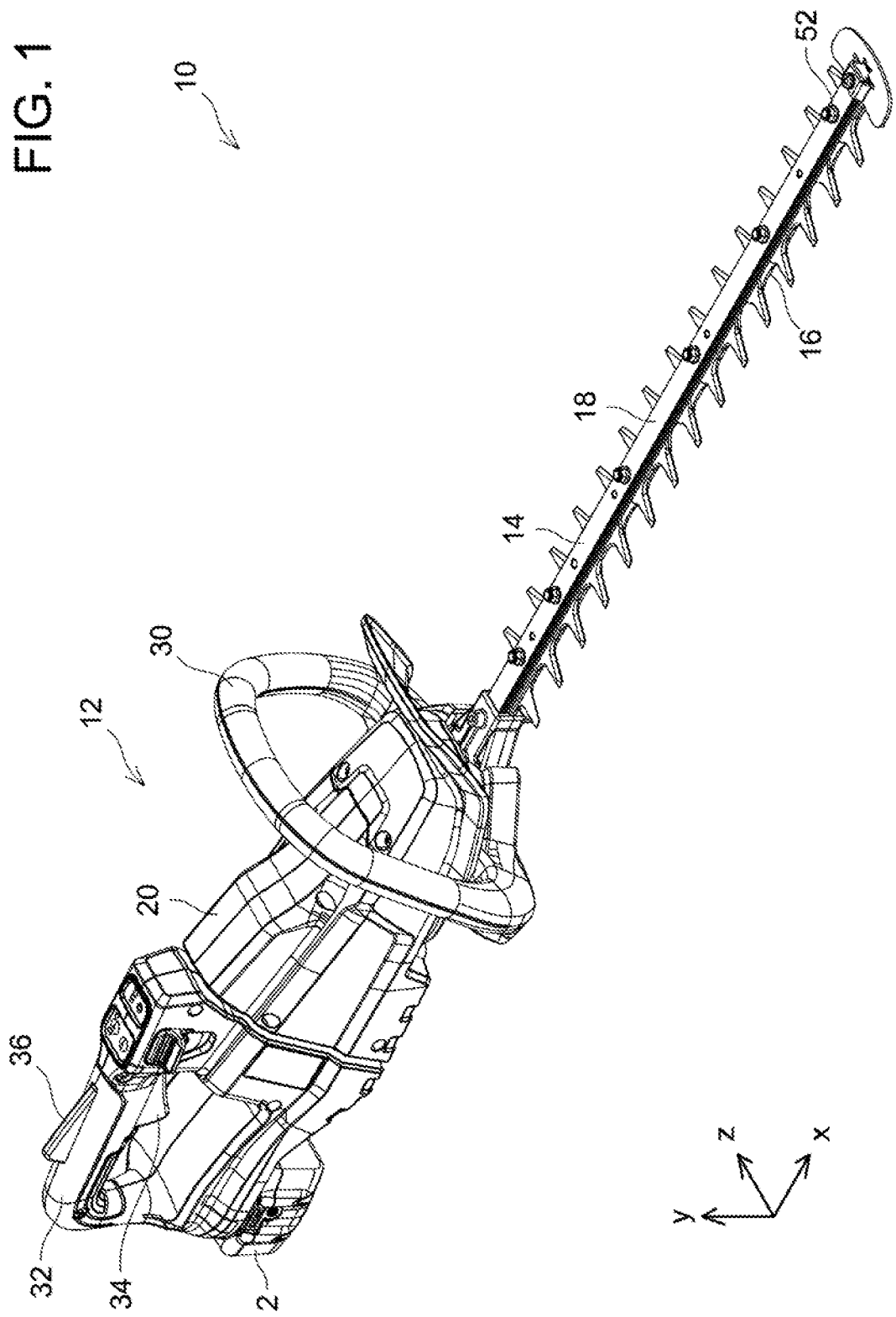
FIG. 1 illustrates a perspective view showing an outer appearance of a gardening trimmer 10 according to an embodiment.

In an aspect of the present teachings, the outer periphery of the guide may comprise a first outer side surface opposing the first inner side surface of the slot. In this case, the first portion may be located within the first outer side surface.

In the aforementioned aspect, at least a part of the first outer side surface may have a curvature radius varying along a circumferential direction. Such a configuration may allow to appropriately adjust an interval between the guide and a blade according to an angle of the guide relative to a slot of the blade. Alternatively, as another aspect, a part or an entirety of the first outer side surface may have the curvature radius that is constant along the circumferential direction.

In the aforementioned aspect, the at least a part of the first outer side surface may be curved along a cycloid curve. Such a configuration may allow to more appropriately adjust the interval between the guide and the blade according to the angle of the guide relative to the slot of the blade. Alternatively, as another aspect, at least a part of the first outer side surface may be curved along another type of curve such as true circle, ellipse, oval, or parabola, for example.

In the aforementioned aspect, an entirety of the first outer side surface may be curved. Alternatively, the first outer side surface may comprise a flat section located different from the first portion.

In the aforementioned aspect, the outer periphery of the guide may further comprise a second outer side surface opposing the second inner side surface of the slot. In this case, the second portion may be located within the second outer side surface.

In the aforementioned aspect, the second outer side surface may be symmetrical (i.e. line-symmetrical) with the first outer side surface. Alternatively, as another aspect, the second outer side surface may be asymmetrical with the first outer side surface.

In one aspect of the present teachings, the first blade may further comprise another slot whose longitudinal direction is parallel to the first direction. In this case, the gardening trimmer may further comprise another guide disposed in the other slot of the first blade so as to guide the reciprocating motion of the first blade. In this case, the other guide may have a same shape as that of the aforementioned guide, or may have a different shape from that of the aforementioned guide.

In the aforementioned aspect, the other guide may be located farther away from the prime mover than the guide is. In addition, the other guide may have a shape different from that of the guide. In this case, the other guide may be a round or a polygonal guide.

In one aspect of the present teachings, the gardening trimmer may further comprise a second blade configured to be driven by the prime mover in a reciprocating manner along the first direction in antiphase with respect to the first blade. In this case, the second blade may comprise a slot whose longitudinal direction extends along the first direction, and the guide may be further disposed in the slot of the second blade and further configured to guide reciprocating motion of the second blade. Alternatively, as another aspect, the second blade may be a blade of stationary type, which is not to be driven (moved) by the prime mover.

In the aforementioned aspect, the slot of the second blade may extend through the second blade along the second direction and comprise a third inner side surface and a fourth inner side surface that extend along the first direction and oppose each other. In this case, each of curvature radii in the first portion and the second portion of the outer periphery of the guide may be greater than a half of a distance between the third inner surface and the fourth inner surface of the slot of the second blade. That is, a part or an entirety of the aforementioned structure implemented for the first blade may also be implemented for the second blade.

In the aforementioned aspect, the slot of the second blade may have an opening shape which is same as that of the slot of the first blade. Alternatively, as another embodiment, the slot of the second blade may have a different shape from that of the slot of the first blade.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved gardening trimmers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

Figure 2:
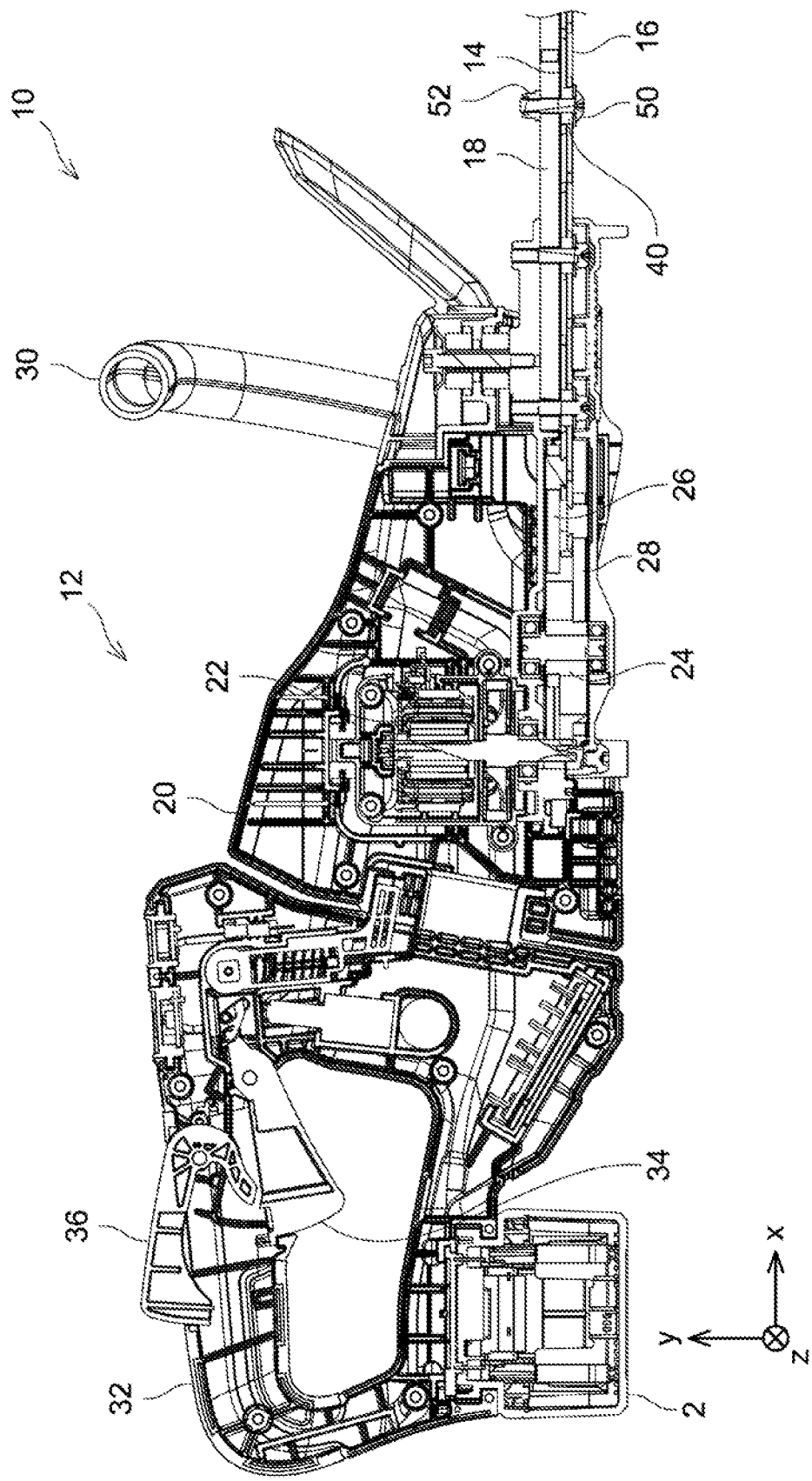
FIG. 2 illustrates a cross-sectional view showing an internal structure of the gardening trimmer 10 according to the embodiment.
Figure 3:
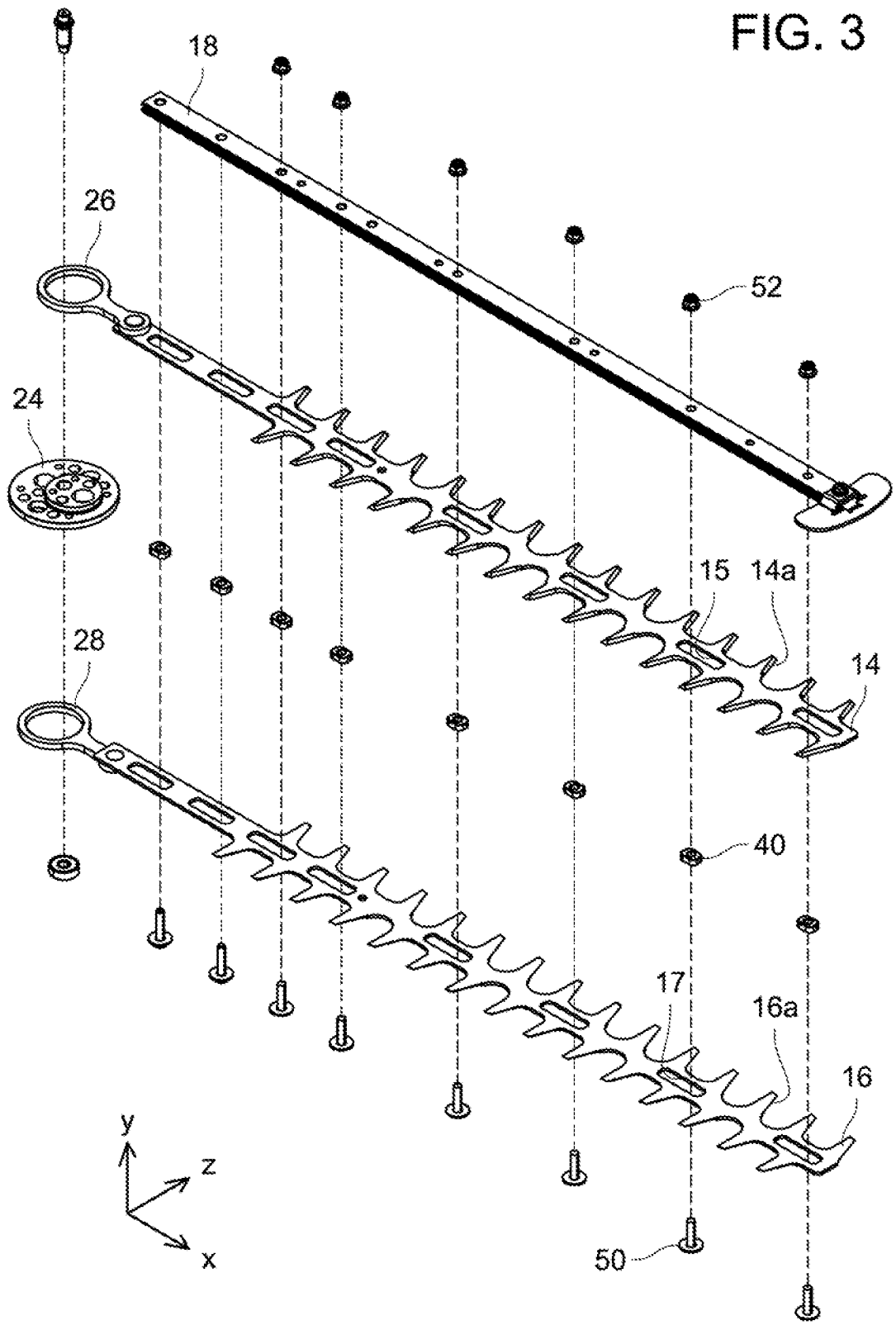
FIG. 3 shows an exploded view showing an arrangement of a pair of blades 14, 16.

With reference to drawings, a gardening trimmer 10 according to an embodiment will be described. The gardening trimmer 10 is a gardening machine primarily used for pruning hedges or shrubs (bushes), and may also be called a hedge trimmer. As shown in FIGS. 1 to 3, the gardening trimmer 10 comprises a body 12 and a pair of blades 14, 16 extending from the body 12 along a first direction X. The pair of blades 14, 16 is supported by a guide bar 18 fixed to the body 12. The guide bar 18 extends from the body 12 along the first direction X, along with the pair of blades 14, 16. The pair of blades 14, 16 includes a first blade 14 and a second blade 16.

The body 12 is configured to detachably receive a battery pack 2. That is, the gardening trimmer 10 according to the present embodiment is a cordless power tool using the battery pack 2 as its power source. Alternatively, in another embodiment, the gardening trimmer 10 may be a power tool to be connected to an external AC power source or external DC power source via a cord. Further, the gardening trimmer 10 may alternatively be a tool configured to be driven by an engine.

The body 12 comprises a housing 20 and a motor 22 arranged within the housing 20. The motor 22 is a prime mover configured to drive the pair of blades 14, 16. The motor 22 is configured to move the respective blades 14 and 16 in anti-phase relative to each other in a reciprocating manner in the first direction X. In this regard, the housing 20 contains therein a crank cam 24, a first connecting rod 26, and a second connecting rod 28. The crank cam 24 is configured to be rotated by the motor 22. The first connecting rod 26 couples the crank cam 24 to the first blade 14, and is configured to convert rotational motion of the crank cam 24 into reciprocating motion of the first blade 14. The second connecting rod 28 couples the crank cam 24 to the second blade 16, and is configured to convert rotational motion of the crank cam 24 into reciprocating motion of the second blade 16.

The housing 20 has a front grip 30 and a rear grip 32. These grips 30, 32 are each configured to be gripped by a user. The user normally operates the gardening trimmer 10 by gripping the front grip 30 with his/her left hand, and gripping the rear grip 32 with his/her right hand. Positions and shapes of the front grip 30 and the rear grip 32 may be suitably modified.

The rear grip 32 has an activation switch 34 and an unlock switch 36. When the user operates the activation switch 34, the motor 22 is supplied with electricity from the battery pack 2 and the motor 22 drives the pair of blades 14, 16. Here, the activation switch 34 is configured to be normally locked mechanically within the housing 20, and the mechanical lock of the activation switch 34 is unlocked only while the unlock switch 36 is operated. Such a configuration may prevent the pair of blades 14, 16 from inadvertently being driven by an erroneous operation on the activation switch 34.

Next, the pair of blades 14, 16 will be described. As aforementioned, the pair of blades 14, 16 includes the first blade 14 and the second blade 16. The first blade 14 has a plurality of teeth 14a aligned along the first direction X. Similarly, the second blade 16 has a plurality of teeth 16a aligned along the first direction X. Due to this, when the first and second blades 14 and 16 move in the reciprocating manner in anti-phase, the teeth 14a of the first blade 14 and the teeth 16a of the second blade 16 come across each other repeatedly, thereby cutting a branch or a leaf of a hedge, for example.

As shown in FIG. 3, the first blade 14 has a plurality of slots 15. The slots 15 are aligned along the first direction X, and a longitudinal direction of each slot 15 extends along the first direction X. Each slot 15 extends through the first blade 14 along a second direction Y that is perpendicular to the first direction X. Each slot 15 has a corresponding guide 40 inserted therethrough so as to guide the reciprocating motion of the first blade 14. The guides 40 are attached to the guide bar 18 with bolts 50 and nuts 52, and are fixed by the bolts 50. Similarly, the second blade 16 has a plurality of slots 17. The slots 17 are also aligned along the first direction X, and a longitudinal direction of each slot 17 extends along the first direction X. Each slot 17 extends through the second blade 16 along the second direction Y that is perpendicular to the first direction X. Each slot 17 of the second blade 16 also has the corresponding guide 40 inserted therethrough so as to guide the reciprocating motion of the second blade 16.

Figure 4:
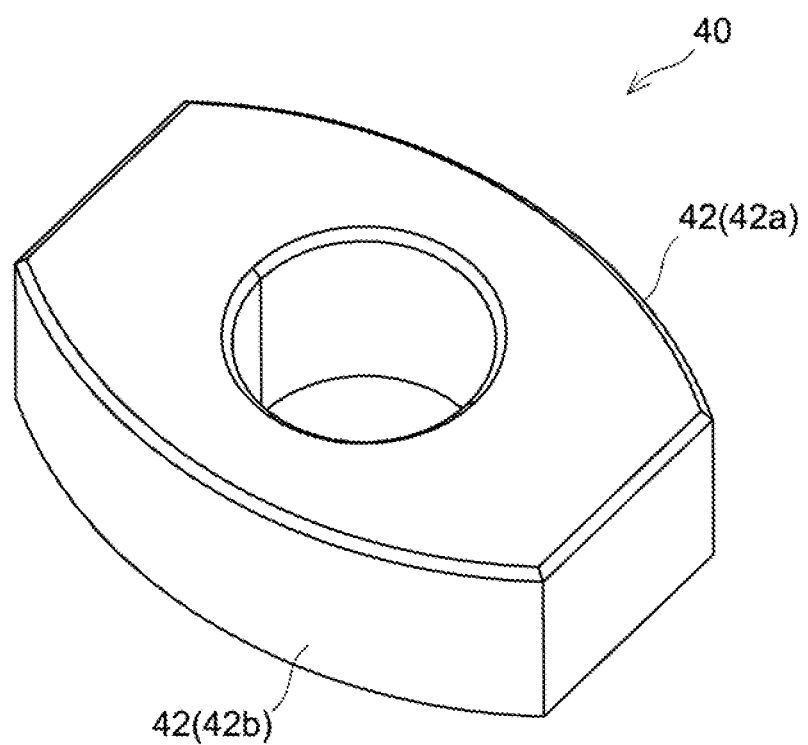
FIG. 4 illustrates a perspective view showing a guide 40.
Figure 5:
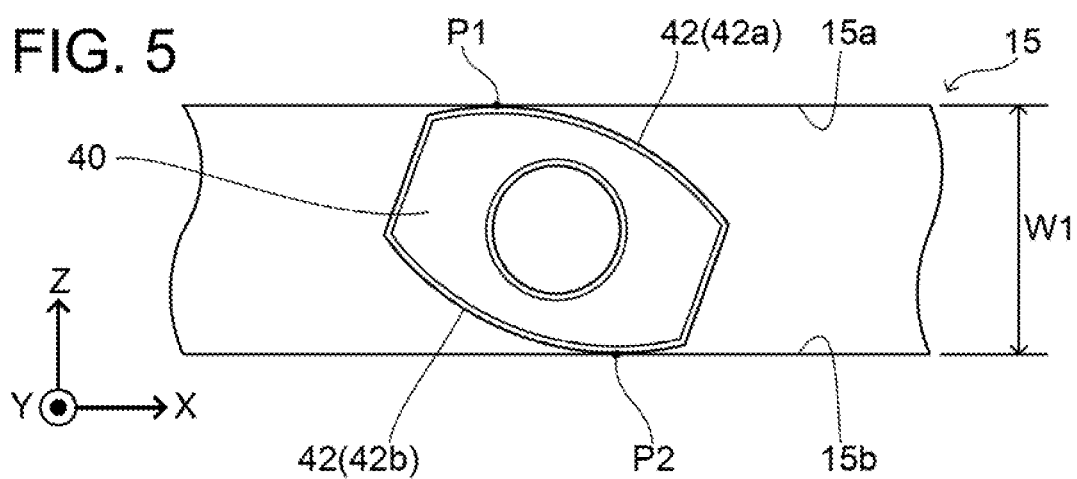
FIG. 5 shows a plan view showing a slot 15 of the first blade 14 and the guide 40.

As shown in FIGS. 4 and 5, each slot 15 of the first blade 14 has a first inner side surface 15a and a second inner side surface 15b. The first inner side surface 15a and the second inner side surface 15b extend along the first direction X with both of the surfaces facing each other. Each guide 40 has a peripheral surface 42 facing the first inner side surface 15a and the second inner side surface 15b of the slot 15. Although not particularly limited, the peripheral surface 42 of each guide 40 includes a first peripheral side surface 42a facing the first inner side surface 15a of the slot 15 and a second peripheral side surface 42b facing the second inner side surface 15b of the slot 15. The first peripheral side surface 42a and the second peripheral side surface 42b are linearly symmetrical with each other. However, alternatively, the first peripheral side surface 42a and the second peripheral side surface 42b may be asymmetrical with each other.

As aforementioned, each guide 40 is fixed by its corresponding one of the bolts 50. Due to this, as shown in FIG. 5, the guide 40 can be fixed in a tilted posture relative to the corresponding slot 15 of the first blade 14. Such a configuration allows the peripheral surface 42 of the guide 40 to contact the first inner side surface 15a of the slot 15 of the first blade 14 at a first portion P1 and to contact the second inner side surface 15b of the slot 15 of the first blade 14 at a second portion P2. Due to this, the reciprocating motion of the first blade 14 is stably guided, suppressing generation of uncomfortable vibration and/or noise.

The first portion P1 is located on the first peripheral side surface 42a of the peripheral surface 42 of the guide 40. The first peripheral side surface 42a is entirely curved with a relatively large curvature radius. In detail, the curvature radius of the first peripheral side surface 42a is greater than a half of a width W1 between the first inner side surface 15a and the second inner side surface 15b of the slot 15. Although not particularly limited, the first peripheral side surface 42a in the present embodiment is curved along a cycloid curve, and the curvature radius thereof varies along a circumferential direction of the guide 40. On the other hand, the second portion P2 is located on the second peripheral side surface 42b of the peripheral surface 42 of the guide 40. The second peripheral side surface 42b is also entirely curved with a relatively large curvature radius. In detail, the curvature radius of the second peripheral side surface 42b is greater than a half the width W1 between the first inner side surface 15a and the second inner side surface 15b of the slot 15. Although not particularly limited, the second peripheral side surface 42b in the present embodiment is also curved along a cycloid curve, and the curvature radius thereof varies along the circumferential direction of the guide 40.

As aforementioned, the peripheral surface 42 of the guide 40 has a shape that may contact the first inner side surface 15a of the slot 15 of the first blade 14 at the first portion P1, and also may contact the second inner side surface 15b of the slot 15 of the first blade 14 at the second portion P2. Such a configuration allows the reciprocating motion of the first blade 14 to be guided stably, and the generation of uncomfortable vibration and/or noise may be suppressed. Further, the peripheral surface 42 of the guide 40 is curved at least at the first portion P1 and the second portion P2, and the curvature radii thereof at the first portion P1 and the second portion P2 are each greater than a half the width W1 between the first inner side surface 15a and the second inner side surface 15b of the slot 15. Due to this, a contact pressure between the guide 40 and the first blade 14 decreases, and friction resistance to be exerted on the first blade 14 accordingly decreases.

Figure 6:
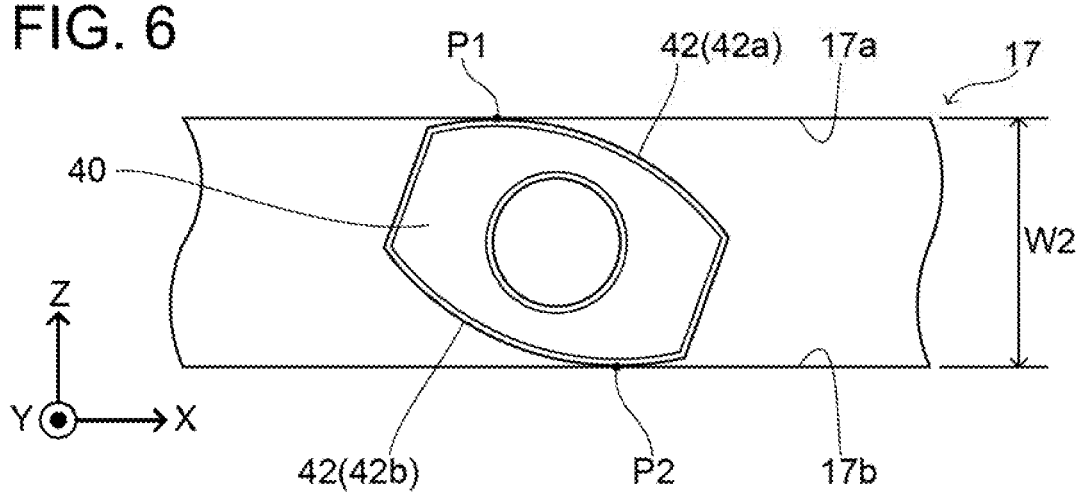
FIG. 6 illustrates a plan view showing a slot 17 of the second blade 16 and the guide 40.

As shown in FIG. 6, a similar configuration to that of the slots 15 of the first blade 14 is employed in each slot 17 of the second blade 16. That is, each slot 17 of the second blade 16 has a third inner side surface 17a and a fourth inner side surface 17b. The third inner side surface 17a and the fourth inner side surface 17b extend along the first direction X with both of the surfaces facing each other. The first peripheral side surface 42a of the guide 40 faces the third inner side surface 17a and the second peripheral side surface 42b of the guide 40 faces the fourth inner side surface 17b. Here, a width W2 between the third inner side surface 17a and the fourth inner side surface 17b is equal to the width W1 between the first inner side surface 15a and the second inner side surface 15b of each slot 15 of the first blade 14.

The peripheral surface 42 of the guide 40 contacts the third inner side surface 17a of the slot 17 of the second blade 16 at the first portion P1 and contacts the fourth inner side surface 17b of the slot 17 of the second blade 16 at the second portion P2. Such a configuration allows also the reciprocating motion of the second blade 16 to be guided stably, and the generation of uncomfortable vibration and/or noise is suppressed. As aforementioned, the width W2 between the third inner side surface 17a and the fourth inner side surface 17b of each slot 17 of the second blade 16 is equal to the width W1 between the first inner side surface 15a and the second inner side surface 15b of each slot 15 of the first blade 14. Accordingly, each of the curvature radii at the first portion P1 and the second portion P2 is greater than a half of the width W2 between the third inner side surface 17a and the fourth inner side surface 17b of the slot 17. Due to this, a contact pressure between the guide 40 and the second blade 16 also decreases, and friction resistance exerted on the second blade 16 accordingly decreases.

Figure 7:
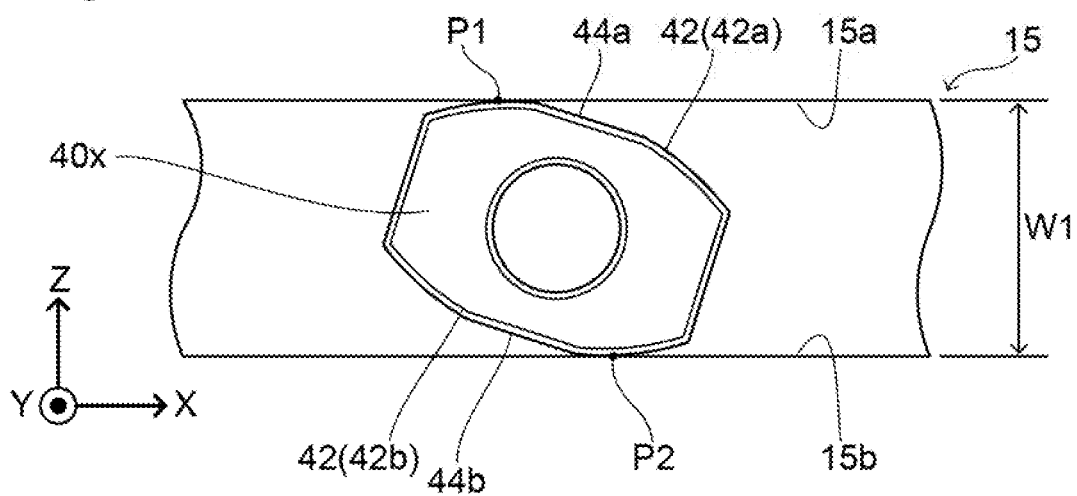
FIG. 7 illustrates the slot 15 of the first blade 14 and a guide 40x according to a variant.

FIG. 7 shows a guide 40x according to a variant. The guide 40x has a flat section 44a in a first peripheral side surface 42a. This flat section 44a is arranged at a different spot from a first portion P1. Similarly, a flat section 44b is arranged in a second peripheral side surface 42b. This flat section 44b also is arranged at a different spot from a second portion P2. As such, a peripheral surface 42 of the guide 40x may include one or more flat sections 44a, 44b. Not being particularly limited to this variant, configurations of the guides 40, 40x may be modified in various manners. However it is preferable that the peripheral surface 42 of each of the guides 40, 40x may be curved at least at the first portion P1 and the second portion P2, and each of the curvature radii at the first portion P1 and the second portion P2 may be greater than a half the width W1 between the first inner side surface 15a and the second inner side surface 15b of the slot 15 of the first blade 14.

The gardening trimmer 10 according to the present embodiment is configured to drive both the blades 14, 16 with the motor 22. However, in another aspect of the present teachings, the gardening trimmer 10 may be configured to drive only one of the blades 14, 16 with the motor 22 or with another type of prime mover.

In the gardening trimmer 10 according to the present embodiment, the pair of blades 14, 16 has a structure of a shear blade, and is configured to shear branches and leaves. However, in another aspect of the present teachings, the gardening trimmer 10 may comprise a single blade having a structure of a saw blade instead of the blades 14, 16, and may be configured to drive that single blade with the motor 22 or with another type of prime mover in a reciprocating manner so as to cut branches and leaves, for example.

Although the gardening trimmer 10 according to the present embodiment presents an example of the blades 14, 16 each having the teeth on both positive and negative sides thereof in a Z direction, the blades may be a single edge type, that is, one with its cutting edge on the positive side or negative side only. In yet another embodiment, the gardening trimmer may be a pole hedge trimmer having blade(s) disposed at a tip of a long pole and configured to be driven in a reciprocating manner and cut hedges of a high location, a paddy field furrow mower configured to cut grass in a furrow of a paddy field, or a scythe mower having blade(s) disposed in front of a walk-behind type push mower and configured to be driven in a reciprocating manner of going leftward and rightward with respect to a traveling direction of the mower.

In the gardening trimmer 10 according to the present embodiment, the plural guides 40 all have a same shape shown in FIG. 4. However in another aspect of the present teachings, one or more of the plural guides 40 may have a shape different from the one shown in FIG. 4, that is, have a round or a polygonal shape, for example. In this case, it is preferable that a guide 40 closest to the body 12 (namely, the leftmost one in FIG. 3) among the plurality of guides 40 has the shape shown in FIG. 4. Such implementation of the shape shown in FIG. 4 for the guide 40 closest to the motor 22, which is a vibration source, may effectively suppress the vibration and/or noise of the gardening trimmer 10.

What is claimed is:

1. A gardening trimmer, comprising:
    a prime mover;
    a first blade configured to be driven by the prime mover in a reciprocating manner along a first direction, the first blade comprising a slot whose longitudinal direction extends along the first direction; and
    a first guide disposed in the slot of the first blade so as to guide reciprocating motion of the first blade,
    wherein
    the slot of the first blade extends through the first blade in a second direction perpendicular to the first direction, and comprises a first inner side surface and a second inner side surface that oppose each other and extend along the first direction,
    the first guide comprises an outer periphery opposing the first and second inner side surfaces of the slot,
    the outer periphery of the first guide comprises a first portion being in contact with the first inner side surface of the slot and a second portion being in contact with the second inner side surface of the slot,
    the outer periphery of the first guide is curved at least at the first portion and the second portion, and
    each of curvature radii of the first portion and the second portion is greater than a half of a distance between the first inner side surface and the second inner side surface of the slot in a direction perpendicular to the first direction and the second direction.

2. The gardening trimmer according to claim 1, wherein the outer periphery of the first guide comprises a first outer side surface opposing the first inner side surface of the slot, and
    the first outer side surface defines the first portion.

3. The gardening trimmer according to claim 2, wherein at least a part of the first outer side surface has a curvature radius varying in a circumferential direction along the outer periphery of the first guide.

4. The gardening trimmer according to claim 2, wherein at least a part of the first outer side surface is curved along a cycloid curve.

5. The gardening trimmer according to claim 2, wherein an entirety of the first outer side surface is curved.

6. The gardening trimmer according to claim 2, wherein the first outer side surface comprises a flat section located different from the first portion.

7. The gardening trimmer according to claim 2, wherein the outer periphery of the first guide comprises a second outer side surface opposing the second inner side surface of the slot, and
    the second outer side surface defines the second portion.

8. The gardening trimmer according to claim 7, wherein the second outer side surface is symmetrical with the first outer side surface.

9. The gardening trimmer according to claim 1, wherein the first blade further comprises another slot whose longitudinal direction is parallel to the first direction, and
    the gardening trimmer further comprises another guide disposed in the another slot of the first blade so as to guide the reciprocating motion of the first blade.

10. The gardening trimmer according to claim 9, wherein the another guide is located farther away from the prime mover than the first guide is and has a shape different from that of the first guide.

11. The gardening trimmer according to claim 1, further comprising a second blade configured to be driven by the prime mover in a reciprocating manner along the first direction in antiphase with respect to the first blade, the second blade comprising a slot whose longitudinal direction extends along the first direction,
    wherein the first guide is further disposed in the slot of the second blade and further configured to guide reciprocating motion of the second blade.

12. The gardening trimmer according to claim 11, wherein the slot of the second blade extends through the second blade along the second direction and comprises a third inner side surface and a fourth inner side surface that extend along the first direction and oppose each other,
the first portion of the first guide is further in contact with the third inner side surface of the slot of the second blade and the second portion of the first guide is further in contact with the fourth inner side surface of the slot of the second blade, and
each of curvature radii in the first portion and the second portion of the outer periphery of the first guide is greater than a half of a distance between the third inner side surface and the fourth inner side surface of the slot of the second blade in the direction perpendicular to the first direction and the second direction.

13. The gardening trimmer according to claim 11, wherein the slot of the second blade has an opening shape which is same as that of the slot of the first blade.

* * * * *